United States Patent

Hirooka et al.

[15] 3,692,754

[45] Sept. 19, 1972

[54] HIGHLY LACTONIZED COPOLYMERS AND ALTERNATING COPOLYMERS USING UNSATURATED ETHERS

[72] Inventors: Masaaki Hirooka, 7-32 Funakicho, Ibaragi-shi; Kenji Takeya, 1900, Kanaoka, Saidaijicho, Okayama-shi; Yoshihiro Uno, 300-43, Minato, Okayama-shi; Akira Yamane, 1900, Kanaoka, Saidaijicho, Okayama-shi; Kunio Maruyama, 1900, Kanaoka, Saidaijicho, Okayama-shi, all of Japan

[22] Filed: March 26, 1970

[21] Appl. No.: 22,997

[30] Foreign Application Priority Data

April 5, 1969     Japan.....................44/26482
Dec. 11, 1969     Japan.....................44/99961

[52] U.S. Cl.......260/80.3 E, 260/29.6 TA, 260/32.4, 260/32.6 N, 260/32.8 N, 260/33.6 UA, 260/80.3 N, 260/80.72, 260/80.73, 260/80.76, 260/80.81, 260/85.5 ES, 260/85.5 R, 260/86.1 E, 260/86.1 R
[51] Int. Cl..........................C08f 15/00, C08f 15/40
[58] Field of Search.........260/80.76, 80.3 E, 80.3 N, 260/85.5 R, 86.1 R, 86.1 E, 80.73, 80.72

[56] References Cited

UNITED STATES PATENTS

3,275,712    9/1966    Siebel et al................260/876
3,305,505    2/1967    Ropp.........................260/29.6

FOREIGN PATENTS OR APPLICATIONS

1,137,117    12/1968    Great Britain............260/85.5

*Primary Examiner*—Joseph L. Schofer
*Assistant Examiner*—Stanford M. Levin
*Attorney*—Stevens, Davis, Miller & Mosher

[57] ABSTRACT

An alternating copolymer composed of at least one monomer of group (A) consisting of unsaturated esters of carboxylic acids and unsaturated ethers, and at least one monomer of group (B) consisting of conjugated vinyl compounds having nitrile or carbonyl radicals, is highly lactonized by treating with an inorganic or organic acid, as produced or after sapoinfication. A novel alternating copolymer composed of the group (A) monomer consisting of at least one unsaturated ether or a mixture of at least one unsaturated ether and at least one unsaturated ester of carboxylic acid, and at least one monomer of the group (B) is also proposed.

13 Claims, No Drawings

HIGHLY LACTONIZED COPOLYMERS AND ALTERNATING COPOLYMERS USING UNSATURATED ETHERS

The present invention relates to lactonized alternating copolymers of unsaturated esters of carboxylic acids or unsaturated ethers and conjugated vinyl compounds having nitrile or carbonyl groups. Particularly, this invention relates to highly lactonized alternating copolymers having lactone content of more than 50 percent by weight. Further, this invention relates to novel alternating copolymers of unsaturated ethers and conjugated vinyl compounds.

The present inventors have found that a copolymer having a lactone content of more than 50 percent by weight can easily be obtained from an alternating copolymer comprising acrylonitrile or acrylic monomer units and hydroxyl group-formable monomer units. In general, it is well-known that oxycarboxylic acids can form lactone rings in the presence of an acidic medium. According to, for example, "Kobunshi Kaguku," Vol. 7, page 142 (1950), it is stated that a lactone ring can be formed by saponifying a copolymer of vinyl acetate and methyl acrylate with an alkali and then treating the saponified copolymer with an acid solution. However, a copolymer of vinyl acetate and methyl acrylate is generally obtained through a radical polymerization, and in the thus obtained copolymer, the vinyl acetate units and the methyl acrylate units are arranged at random. In order to form a lactone ring, on the other hand, such an arrangement of units that the units adjacent to a vinyl acetate unit are always methyl acrylate units are required. Accordingly, it has been impossible or difficult to obtain a lactonized polymer having a lactone content of 50 percent by weight or more by lactonizing a copolymer obtained by a conventional radical polymerization of vinyl acetate and methyl acrylate, because both units are arranged at random in the copolymer. The present inventors have first succeeded in obtaining such highly lactonized copolymers having lactone contents of more than 50 percent by weight by using alternating copolymers of unsaturated esters of carboxylic acids or unsaturated ethers and conjugated vinyl compounds having nitrile or carbonyl groups. Among those, the alternating copolymers of unsaturated ethers and conjugated vinyl compounds having nitrile or carbonyl groups are novel ones. It has been further found that a novel multi-component alternating copolymers can be obtained when a mixture of unsaturated ethers and unsaturated esters of carboxylic acids [group (A) monomers] and conjugated vinyl compounds having nitrile or carbonyl groups [group (B) monomers], in which group (A) monomer units are linked only to group (B) monomer units and group (B) monomer units are linked only to the group (A) monomer units.

An object of the present invention is to provide a lactonized alternating copolymer, especially a highly lactonized copolymer having a lactone content of more than 50 percent by weight.

Another object of the present invention is to provide a novel alternating copolymer comprising an unsaturated ether as one of the constituents.

A further object of the present invention is to provide a method for producing the products mentioned above.

Other objects and advantages of the present invention will be apparent from the following description.

The present invention provides a lactonized polymer derived from an alternating copolymer composed of at least one monomer of the group (A) having the formula:

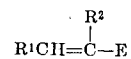

wherein $R^1$ and $R^2$ each is a hydrogen atom, a halogen atom, a non-polymerizable hydrocarbon or halohydrocarbon radical having one to 20 carbon atoms, provided at least one of $R^1$ and $R^2$ is a hydrogen atom, and E is selected from the group consisting of $-O-R^3$, $-CH_2-O-R^3$,

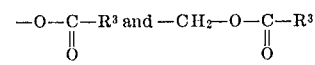

where $R^3$ is a non-polymerizable hydrocarbon or halohydrocarbon radical having one to 20 carbon atoms, and at least one monomer of the group (B), a conjugated vinyl compound having the formula:

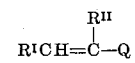

wherein $R^I$ and $R^{II}$ each are non-polymerizable hydrocarbon or halohydrocarbon radicals having one to 20 carbon atoms, halogen atoms or hydrogen atoms, provided at least one of $R^I$ and $R^{II}$ is hydrogen atom, and Q is a nitrile group or a

group in which Y is $OR^{III}$, OMe, $NR^{IV}R^V$ or a halogen atom, where $R^{III}$, $R^{IV}$ and $R^V$ each are hydrogen atoms or organic radicals having one to 20 carbon atoms, including the case where $R^{IV}$ and $R^V$ are bonded to each other at the position other than the nitrogen; and Me is an ammonium radical or the monovalent portion of an element of Groups I to III of Mendeleev's Periodic Table, said alternating copolymer having a structure such that monomer units from group (A) alternate with monomer units from group (B), each monomer unit being linked only to monomer units from the other group.

The novel alternating copolymer provided according to the present invention is composed of the group ($A_1$) monomer consisting of at least one unsaturated ether having the formula:

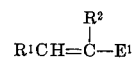

wherein $E^1$ is selected from $-OR^3$ and $-CH_2-P-R^3$, $R^1$, $R^2$ and $R^3$ are the same as defined above, or a combination of at least one said unsaturated ether ($A_1$) and at least one unsaturated ester of carboxylic acid [group ($A_2$) monomer] having the formula:

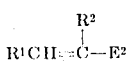

wherein $E^2$ is selected from

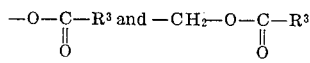

$R^1$, $R^2$ and $R^3$ are the same as defined above, and at least one monomer of the group (B) defined above.

In the present invention, said alternating copolymers can be produced by a process which comprises alternately linking the group (A) monomer to the group (B) monomer through the formation of a coordination complex of the nitrile or carbonyl group of the group (B) monomer with an electron acceptor. Examples of the electron acceptor are Lewis acids, such as metal halides and the like. The details and characteristics of the alternating copolymerization by the complex copolymerization mechanism are described, for example, in the specification of British Pat. No. 1,137,117. Some embodiments of the process for producing said alternating copolymer are as follows:

The group (A) monomer and the group (B) monomer are contacted with an organometallic halide having the formula:

$$MR'_nX_{3-n}$$

wherein M is aluminum or boron, R' is an ordinary organic radical, X is a halogen atom and n is an arbitrary value of from 1 to 2 or a mixture of at least two compounds selected from the group consisting of compounds having the formulas:

$$MR'_nX_{3-n}, M'R''_3 \text{ and } M''X'_3$$

wherein M' and M'' each are aluminum or boron; R'' is an ordinary organic radical and X' is a halogen atom, or alternatively, an organometallic compound of a metal of Group IIb, IIIb or IVb of Mendeleev's Periodic Table is first contacted with a halide of a metal of Group IIIb or IVb of the same Periodic Table in the presence of at least the group (B) monomer to form a complex of the conjugated vinyl monomer coordinated with the organo-metal halide component (at least one of said metals being aluminum or boron), through which complex the group (A) monomer is then contacted with the group (B) monomer, whereby an alternating copolymer is obtained. If required, the above-mentioned alternating copolymerization may be effected in the presence of at least one promoting compound selected from the group consisting of compounds of transition metals, oxygen and organic peroxides, whereby the copolymerization proceeds more effectively.

In the alternating copolymerization of the group (A) and the group (B) monomer according to the present invention, a multicomponent alternating copolymer can be obtained when the group (A) monomer comprises two or more monomers or the group (B) monomer comprises two or more monomers, or even when the group (A) monomer and the group (B) monomer both comprise two or more monomers, i.e., four or more monomers in total are used. In the multicomponent copolymerization under the conditions for producing an alternating copolymer, the group (A) monomer is in general copolymerized alternately with the group (B) monomer. For instance, when two monomers of group (B) and one monomer of group (A) are subjected to copolymerization, a terpolymer is obtained, in which the total content of the group (B) monomer is always 50 mole percent. In this case, the ratio of two monomers of group (B) to each other in the produced copolymer can be varied at will because this ratio dependes on the ratio of the two monomers used, whereby any copolymer can be obtained by selecting a suitable ratio of the two.

The group (A) monomers used in the present invention are given by the following four formulas:

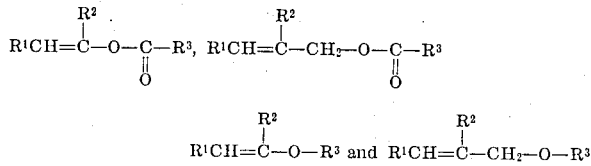

wherein $R^1$, $R^2$ and $R^3$ are the same as defined hereinbefore. Halogens used for $R^1$ and $R^2$ are chlorine, bromine, iodine, and fluorine. Preferable examples of the non-polymerizable hydrocarbon or halohydrocarbon radical having one to 20 carbon atoms are alkyl, aryl, aralkyl, alkylaryl, cycloalkyl, bridged-ring hydrocarbons, and halogen-substituted derivatives thereof. The preferred compounds of the group (A) monomer used in the present invention are those having e-values of less than 1.0, particularly less than 0.5 according to the Price-Alfrey theory of monomer reactivity index, Q and e.

The group (A) monomers are vinyl or allyl compounds of carboxylic acids or ethers and substituted compounds thereof with halogen atoms, hydrocarbon radicals or halohydrocarbon radicals. Preferable compounds are vinyl carboxylates, allyl carboxylates, vinyl hydrocarbyl or halohydrocarbyl ethers and allyl hydrocarbyl or halohydrocarbyl ethers.

Examples of said preferred unsaturated ester of carboxylic acid are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylate, vinyl stearate, vinyl levulinate, ethylvinyl oxalate, vinyl chloroacetate, vinyl dichloroacetate, vinyl benzoate, vinyl cyclohexane carboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, α-methallyl acetate, β-methallyl acetate, γ-methallyl acetate, methylmethallyl oxalate, γ-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl ether, β-chlorovinyl methyl ether, β-bromovinyl methyl ether, vinyl ethyl ether, iospropenyl ethyl ether, β-chlorovinyl ethyl ether, β-bromovinyl ethyl ether, vinyl 2-chloroethyl ether, vinyl trifluoroethyl ether, vinyl propyl ether, vinyl isopropyl ether, β-chlorovinyl isopropyl ether, vinyl butyl ether, β-chlorovinyl butyl ether, vinyl isobutyl ether, β-chlorovinyl isobutyl ether, β-bromovinyl isobutyl ether, vinyl tert-butyl ether, vinyl neopentyl ether, vinyl n-hexyl ether, vinyl 2-ethylhexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl bonzyl ether, vinyl p-chlorobenzyl ether, vinyl α,α-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tert-butyl ether, allyl octyl ether, allyl phenyl ether, allyl p-chlorophenyl ether, allyl 2-chlorophenyl ether, allyl 2,4-dichlorophenyl ether, allyl α-naphthyl ether, allyl benzyl ether, methallyl methyl ether, methallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used. Most valuable compounds are vinyl methyl ether, vinyl isobutyl ether, vinyl 2-chloroethyl ether and vinyl 3-chloropropyl ether.

The group (B) monomer used in this invention is a conjugated vinyl monomer having the formula,

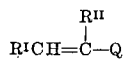

wherein Q is a nitrile group or a

group, and Y is as defined hereinbefore. The organic radical having one to 20 carbon atoms used for $R^{III}$, $R^{IV}$ and $R^V$ in Y is preferably a common hydrocarbon or halohydrocarbon radical, such as, for example, alkyl, aryl, aralkyl, alkylaryl, cycloalkyl radicals and halogen-substituted radicals thereof. Halogens used for Y are chlorine, bromine, iodine and fluorine. Me is an ammonium radical or the monovalent portion of an element of Groups I to III of Mendeleev's Periodic Table, such as, for example, lithium, sodium, potassium, rubidium, cesium, copper, silver, beryllium, calcium, strontium, barium, magnesium, zinc, cadmium, mercury, boron, aluminum, gallium, etc. The monovalent portion referred to herein is such that when an element of Groups I to III of Mendeleev's Periodic Table is represented by Me', the monovalent portion Me of a divalent element is Me'/2 and that of trivalent element is Me'/3. Of these, monovalent salts, i.e. salts of the Group I elements and ammonium salts are particularly preferable.

In case both $R^I$ and $R^{II}$ in the formula are hydrogen atoms, the (B) group monomers are acrylonitrile or acrylic compounds, such as acrylic esters, acrylamides (including N-substituted acrylamides and N,N-disubstituted acrylamides), acryloyl halides, acrylic acid and acrylic acid salts.

In case any one of $R^I$ and $R^{II}$ is not hydrogen atom, this group is a hydrocarbon residue, a halogen-containing hydrocarbon radical, a halogen atom, or a hydrocarbon residue having inert substituents. The hydrocarbon radicals frequently used are, for example, alkyl, aryl, aralkyl, alkylaryl, and cycloalkyl groups. Said halogen or the halogen contained in the hydrocarbon group includes chlorine, bromine, iodine, and fluorine. Consequently, in this case, monomers are α- or β- substituted acrylonitriles and α- or β-substituted acrylic compounds.

Examples of the α- and β-unsubstituted acrylic compounds used as the group (B) monomer are methyl acrylate, ethyl acrylate, n-butyl acrylate, n-amyl acrylate, 2-ethylhexylacrylate, octadecyl acrylate, allyl acrylate, o-toluyl acrylate, benzyl acrylate, cyclohexyl acrylate, 2-chloroethyl acrylate, β-chloroallyl acrylate, acrylamide, N-methylacrylamide, N-n-butylacrylamide, N-2-ethylhexylacrylamide, N-stearylacrylamide, N,N-dimethylacrylamide, acrylyl morpholine, acrylyl pyrrolidine, acryloyl chloride, acrylic acid, sodium acrylate, potassium acrylate, zinc acrylate, aluminum acrylate and ammonium acrylate. Examples of α- or β-substituted conjugated vinyl compounds are methyl methacrylate, ethyl methacrylate, butyl methacrylate, phenyl methacrylate, 2-chloroethyl methacrylate, methyl α-ethylacrylate, methyl α-phenylacrylate, methyl α-chloroacrylate, methacrylamide, N-ethylmethacrylamide, methacrylyl piperidine, α-chloromethylacrylamide, methacryloyl chloride, methacrylic acid, sodium methacrylate, methacrylonitrile, α-ethylacrylonitrile, α-chloroacrylonitrile, α-chloromethylacrylonitrile, ethyl crotonate, crotonamide, crotonitrile, methyl cinnamate, butyl cinnamate, chloromethyl cinnamate, cinnamonitrile, methyl β-ethylacrylate and methyl β-chloromethylacrylate.

Among these compounds, acrylonitrile, alkyl acrylates, acrylic acid, acrylamides and alkyl methacrylates are frequently used. Especially, acrylonitrile, methyl acrylate and methyl methacrylate are useful monomers.

Alternating copolymers in the present invention are prepared using the specific catalysts described before. The details of the polymerization procedures and characteristics of the catalysts are explained, for example, in the specification of British Pat. No. 1,137,117.

Preferable catalysts in the present invention are the compounds having the formula $MR'_nX_{3-n}$, especially alkyl aluminum halides and alkyl boron halides. These are alkylaluminum dihalides, alkylaluminum sesquihalides, dialkylaluminum halides, alkylboron dihalides and dialkylboron halides. Especially, ethylaluminum sesquichloride, ethylaluminum dichloride, diethylaluminum chloride, ethylboron dichloride and diethyl boron chloride are most useful compounds. Of course, other R' radicals such as hydrocarbon radicals having one to 20 carbon atoms such as aryl, alkenyl, aralkyl, alkylary and cycloalkyl are usable for the catalyst components.

Organometallic compounds of metals of Groups IIb, IIIb or IVb of Mendeleev's Periodic Table, which are used as suitable catalysts for the alternating copolymerization, contain as the metallic constituents zinc, cadmium, mercury, boron, aluminum, potassium, indium, thallium, germanium, tin and lead, and most preferably, zinc, boron, aluminum and tin. As the organic constituents there are preferably used hydrocarbon radicals and most preferably, alkyl, alkenyl, aryl, aralkyl, alkylaryl and cycloalkyl. Particularly useful compounds are those having the formula: $M'''R'''_nX''_{p-n}$, wherein $M'''$ is a metal of Group IIb, IIIb or IVb of Mendeleev's Periodic Table, $R'''$ is a hydrocarbon radical having one to 20 carbon atoms or a derivative thereof, $X''$ is a halogen atom, $p$ is the valency of the metal, and $n$ is an arbitrary number of from one to $p$, the most effective compounds being those in which $n$ is $p$. Typical compounds are diethyl zinc, triethylboron, tributyl boron, triethylaluminum and tetraethyltin.

The metal halides used as the catalyst components to be mixed with the above organometallic compounds are halides of metals of Group IIIb or IVb of Mendeleev's Periodic Table, for example, halides of boron, aluminum, gallium, indium, thallium, germanium, tin and lead. The halogens used are chlorine, bromine, iodine and fluorine. Said metal halides may contain other radicals in addition to halogen atoms. Particularly preferable metal halides for the alternating copolymerization of the present invention are those having the formula $M''''X''''_mR''''_{q-m}$, wherein $M''''$ is a metal of Group IIIb or IVb of Mendeleev's Periodic Table, $X''''$ is a halogen atom, $R''''$ is a hydrocarbon radical having one to 20 carbon atoms or a derivative thereof, $q$ is the valency of the metal, and $m$ is an arbitrary number of from 1 to $q$, the most effective compounds being those in which $m$ is $q$. Preferable examples of those metal halides are boron trichloride, boron trifluoride, aluminum trichloride, aluminum tribromide and tin tetrachloride.

The organic peroxides used in the present method are ordinary peroxides, such as diacyl peroxides, ketone peroxides, aldehyde peroxides, ether peroxides, hydroperoxides, dihydrocarbyl peroxides, esters of peracids, dihydrocarbyl percarbonates, percarbamates, etc. Examples of said peroxides are benzoyl peroxide, lauroyl peroxide, acetyl peroxide, methyl ethyl ketone peroxide, cyclohexanone peroxide, tert-butyl hydroperoxide, cumene hydroperoxide, di-tert-butyl peroxide, dicumyl peroxide, tert-butyl cumyl peroxide and tertbutyl perbenzoate.

The preferable compounds of transition metal used as promoter in the present invention, are the compounds of transition metals of Group IVa, Va, VIa, VIIa and VIII of Mendeleev's Periodic Table, containing at least one member selected from the group consisting of a halogen atom and alkoxy, β-diketo and acyloxy groups. The β-diketo groups are preferably acylacetonyl groups, especially acetyl acetonyl groups. Examples of the transition metal of Group IVa, Va, VIa, VIIa and VIII of Mendeleev's Periodic Table are titanium, zirconium, vanadium, chromium, molybdenum, tungsten, manganese, iron, cobalt, nickel, palladium, rhodium and platinum. Among these, titanium, zirconium, vanadium, chromium, iron, cobalt and nickel are preferable, and particularly, the use of vanadium and cobalt gives favorable results. Preferable examples are titanium tetrachloride, vanadium tetrachloride, vanadyl trichloride, triethyl orthovanadate, vanadium trisacetylacetonate, chromium trisacetylacetonate, manganese trisacetylacetonate, cobalt trisacetylacetonate, cobalt naphthenate, and nickel stearate.

In carrying out alternating copolymerization in the present invention to obtain selectively the desired alternating copolymer, proper conditions for the reaction should be chosen so as to avoid side reactions, since the unsaturated ethers are susceptible to cationic polymerization with Lewis acids. For this reason, it is preferable to use a catalyst of a low Lewis acidity, or to use the catalyst in an amount less than that of the group (B) monomer. In some cases, the group (A) monomer is preferably used in a smaller quantity than that of the group (B) monomer. On the other hand, to obtain selectively an alternating copolymer, the other necessary conditions are chosen so that at least one of the monomers in the reaction system should not be homopolymerized. Among the unsaturated ethers there exist various degrees of susceptibility to cationic polymerization. Therefore, it is preferred to choose unsaturated ethers with a relatively low susceptibility to cationic polymerization. In this respect, vinyl ethers containing a halohydrocarbon residue are more suitable than those containing a hydrocarbon residue free from halogen for producing selectively an alternating copolymer.

The halogen-containing metal compound, which is one of the catalyst components in the invention, is used in an amount of 0.001 to 10 moles, preferably 0.01 to 1.5 moles, most preferably 0.01 to 0.9 mole, per mole of the group (B) monomer. A larger or smaller amount of said metal compound may, of course, be used. It is effective to carry out the polymerization in the presence of an organic peroxide, a compound of transition metal, or oxygen. The advantageous effect of these compounds can distinctly be recognized even at a temperature as low as $-78°$ C and even in a small amount, for example, 0.001 to 20 mole percent, preferably 0.01 to 5 mole percent based on the group (B) monomer.

The alternating copolymerization can be carried out under reduced pressure or under any pressure ranging from an inert gas diluted state up to 100 kg./cm², the most frequently used pressure being atmospheric pressure.

The polymerization temperature may arbitrarily be selected from temperatures ranging from such a low temperature as $-150°$ C to such a high temperature as $+100°$ C. At lower temperatures, homopolymerization proceeds with difficulty, so that lower polymerization temperatures favor the formation of purer alternating copolymer. The polymerization at room temperature or higher temperatures also proceeds effectively.

The present copolymerization method may be effected either in liquid monomers by use of the bulk polymerization technique or in the presence of common inert solvents. Examples of the inert solvents are common hydrocarbons and halogen-containing hydrocarbons.

The novel alternating copolymers obtained by using unsaturated ethers are useful, for example, as rubbers, plastics, films, sealants, adhesives, caulking agents, binders, and so on.

After the completion of the polymerization reaction, after-treatments are effected according to ordinary procedures to purify and recover the polymerization product.

According to the present process, the alternating copolymer thus obtained can be lactonized in the following manner:

1. Direct acid treatment

The resulting alternating copolymer is treated with an inorganic acid, such as sulfuric acid, hydrochloric acid, nitric acid, phosphoric acid, etc. and/or an organic acid, such as formic acid, acetic acid, oxalic acid, toluene sulfonic acid, etc. at a pH of 2 or less (when the pH is higher than 2, the lactonization proceeds very slowly, and hence, it is not desirable). The conversion to the lactone rings in the copolymer can optionally be controlled by suitably selecting the acid treatment conditions, that is, a treating temperature and time. Moreover, this acid treatment can be applied either to a homogeneous system or a heterogeneous system. The mechanism of the lactonization is considered to be as follows:

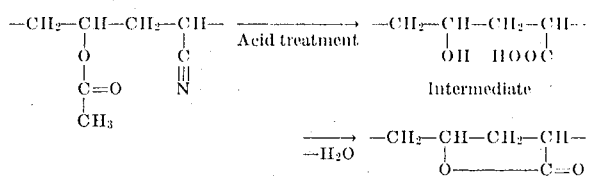

This reaction can be effected in one step, and hence, is very effective in industry.

2. Lactonization after saponification with alkali

The above-mentioned alternating copolymer is treated with an alkali, such as NaOH KOH, Ca(OH)$_2$NH$_4$OH, etc. at a pH of more than 10 (when the pH is less than 10, the saponification reaction proceeds very slowly, and therefore, such a pH is not desired) to saponify the copolymer, and then treating the saponified copolymer with the same acid as used in the direct acid treatment at a pH of less than 3.5 (when the pH is more than 3.5, lactonization reaction proceeds extremely slowly, and hence, such a pH is not desired) to lactonize the copolymer. The conversion to the lactone rings in the copolymer can be optionally controlled by suitably selecting the alkali treatment conditions and the acid treatment conditions, i.e. the alkali concentration, the acid concentration, the treatment temperature and the treatment time. Further, the above two treatments can be applied to either homogeneous system or heterageneous system.

The mechanism of lactonization in said two step treatment is considered to be as follows:

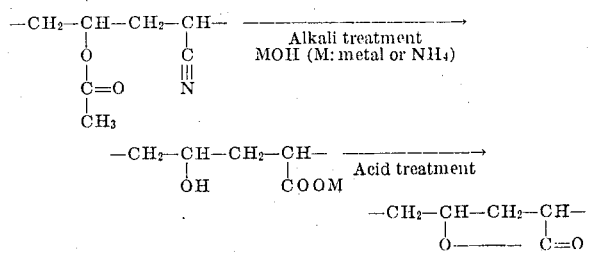

According to the lactonization process of the present invention, the conversion of the alternating copolymer to lactone ring is easily attained to 50 percent by weight or more, and usually 70 percent or more.

If the treating conditions are suitably selected, it is possible to exceed 90 percent conversion.

The thus highly lactonized polymer is insoluble in benzene, alcohol or acetone, but soluble in dimethylformamide, dimethylsulfoxide, γ-butyrolactone, ethylene carbonate, a concentrated aqueous sodium rhodanate solution and the like. Further, it is a white polymer having excellent thermal resistance and a good processability, and shaped articles therefrom, such as film, fiber and others, are tough. Moreover, the thermal resistance of the lactonized polymer and shaped articles therefrom can be further enhanced by adding a polyvalent metal salt to the treating solution.

The following Examples illustrate the present invention in more detail. However, the present invention should not be construed to be limited to the Examples. In the Examples, all percentages and parts are by weight unless otherwise specified.

EXAMPLE 1

In a 300-ml. glass reactor provided with a stirrer were charged 0.20 mole of methyl methacrylate and 30 ml. of toluene containing 40 millimoles of ethyl-aluminum sesquichloride (Et3Al$_2$Cl$_3$) at −78° C. under a nitrogen atmosphere, and 0.35 mole of vinyl butyl ether was then added with stirring to the resulting mixture. The temperature was thereafter elevated to 0° C., and the mixture was subjected to polymerization for 3 hrs. at said temperature. The polymerization was stopped by adding methanol acidified with hydrochloric acid, the resultant copolymer was isolated, and purified to obtain 24.1 g. of a white solid. 2.5 g. of the copolymer was dissolved in 36 g. of acetonitrile, and to the resulting solution were added 10 g. of sulfuric acid and 4 g. of water. The resulting solution was heated at 82° C. for 3 hrs. to hydrolyze both the methyl methacrylate unit and the vinyl butyl ether unit, whereby a polymer having 84 percent of a lactone unit,

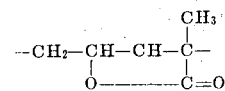

was obtained. This lactone content is approximate to the theoretical value, 91.6 percent, when a completely alternating copolymer is lactonized according to the Flory theory. Therefore, the copolymer obtained in this Example was confirmed to be an alternating copolymer.

The lactone content was calculated from the difference between the amount of the carboxyl group present in the lactonized polymer and that in the hydrolyzed polymer, these amounts being determined by conductometric titration.

EXAMPLE 2

Into a 300-ml. glass reactor provided with a stirrer at −20° C. under a nitrogen atmosphere were charged 0.20 mole of acrylonitrile (Q = 0.60, e = 1.20) and 30 ml. of xylene containing 50 millimoles of triethylaluminum and 50 millimoles of aluminum tribromide, and the temperature was then elevated to 15° C. with well stirring. To the resulting mixture were added 0.15 mole of vinyl propionate (Q = 0.052, e = 0.07) and 0.15 mole of isobutyl vinyl ether (Q = 0.014, e = −1.64), and the resulting mixture was subjected to polymerization at said temperature for 5 hrs. After the polymerization was terminated by adding methanol acidified with hydrochloric acid, the resulting copolymer was isolated and purified to obtain 19.7 g. of a copolymer. 2 g. of this copolymer was dissolved in 50 ml. of acetone, and to the resulting solution were added 5 g. of potassium hydroxide and 15 ml. of water and the resulting solution was boiled under reflux for 3 hrs. to saponify the copolymer. One part of the thus saponified copolymer was dissolved in 100 parts of water, and 50 parts of glacial acetic acid was added to the resulting solution. The resulting mixture was boiled under reflux for 3 hrs. to lactonize the copolymer, whereby a polymer having a lactone content of 89 percent was obtained. The lactone content was determined in the same manner as in Example 1.

Since the lactone content is very close to the theoretical value, 91.6 percent, the produced copolymer is confirmed to be an almost completely alternating copolymer.

EXAMPLE 3

The air in a 50-ml. glass reactor with a stirrer was replaced by nitrogen under vacuum, and the reactor was cooled to −20° C., at which temperature 20 millimoles of acrylonitrile and 20 millimoles of 2-chloroethyl vinyl ether were introduced into the reactor under a nitrogen atmosphere, and 2 ml. of heptane containing 2 millimoles of ethylboron dichloride was then added thereto. The resulting mixture was subjected to polymerization for 3 hrs. The reaction product was treated with methanol to obtain 0.86 g. of a copolymer. The results of the elementary analysis of the copolymer were as follows: C, 52.47 %; H, 6.40 %; N, 8.60 %; Cl, 21.71 %; O, 10.75 %. These values were in close agreement with the theoretical values of alternating copolymer, C, 52.66 %; H, 6.27 %; N, 8.78 %; Cl, 22.26 %; O, 10.03 %.

EXAMPLE 4

The procedure of Example 3 was repeated except that 20 millimoles of methyl acrylate was substituted for the acrylonitrile to obtain 0.82 g. of a copolymer. The intrinsic viscosity of the copolymer was 1.45 dl/g as measured in benzene at 30° C. The oxygen content of the copolymer was 25.25 percent, which well agrees with the theoretical value, 25.19 percent, calculated for the alternating copolymer.

EXAMPLE 5

The procedure of Example 3 was repeated except that 40 millimoles of isobutyl vinyl ether was used as the group (A) monomer and 20 millimoles of methyl acrylate was used as the group (B) monomer, whereby 24.5 g. of a copolymer was obtained. The intrinsic viscosity of the copolymer was 5.25 dl/g as measured in benzene at 30° C. The oxygen content of the copolymer was 25.78 percent, which is in close agreement with the theoretical value, 25.80 percent, calculated for the alternating (1 : 1) copolymer.

EXAMPLE 6

Into a 200-ml. glass reactor with a stirrer maintained at −20° C under a nitrogen atmosphere were charged 0.116 mole of acrylonitrile ($Q = 0.60$, $e = 1.20$) and 0.116 mole of methyl acrylate ($Q = 0.42$, $e = 0.60$), and then 40 millimoles of ethylaluminum dichloride ($EtAlCl_2$) in o-dichlorobenzene (0.67 mole/l.) was charged thereinto. The resulting mixture was heated with well stirring to 15° C, at which 0.25 mole of vinyl acetate ($Q = 0.026$, $e = −0.22$) was added to the mixture, and the resulting mixture was subjected to polymerization for 5 hrs. The polymerization started immediately upon adding vinyl acetate and after 5 hrs. a viscous polymer solution was obtained. The polymerization was terminated by adding methanol acidified with hydrochloric acid, and the reaction product was thereafter separated and purified with methanol to obtain 24.3 g. of a white solid copolymer.

The same procedure as above was repeated, except that 0.232 mole of acrylonitrile alone was substituted for the combination of acrylonitrile and methyl acrylate as the group (B) monomer or 0.232 mole of methyl acrylate alone was substituted for the combination of acrylonitrile and methyl acrylate as the group (B) monomer to effect alternating copolymerization. The thus obtained three, in total, alternating copolymers were lactonized under the following conditions: 3 parts of the copolymer was dissolved in 72 parts of acetonitrile, and to the resulting solution were added 20 parts of p-toluene sulfonic acid and 8 parts of water. The resulting mixture was treated at 80° C for 5 hrs. The composition of the copolymer and the lactone content in the lactonized polymer were as shown in Table 1.

The acrylonitrile content in the copolymer was determined by nitrogen analysis, and the methyl acrylate content was determined by saponifying the copolymer with NaOH and measuring the resulting carboxyl groups by conductometric titration (when acrylonitrile was contained in the copolymer, the acrylonitrile content determined by nitrogen analysis was reduced from the carboxyl group content). The lactone content was expressed by percentage of the group,

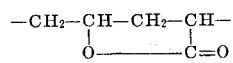

based on the weight of the copolymer. The analysis of the lactone group was carried out according to the method described in "Kobunshi Kagaku," Vol. 7, pages 142 to 154 (1950). That is, a polymer having a predetermined lactone content was prepared from a copolymer of acrylonitrile and vinyl acetate, and the infrared absorption at 1,176 cm$^{-1}$ of this polymer was compared with that of the copolymer obtained in this Example.

For comparison, a copolymer of methyl acrylate and vinyl acetate was prepared with a conventional radical catalyst under the following conditions, and then lactonized, and the lactone content was determined by the above-mentioned method:

Monomer composition: Methyl acrylate/Vinyl acetate = 20/80 (by mole)
Monomer concentration: 50 percent
Polymerization solvent: Benzene
Polymerization catalyst: 0.2 percent benzoyl peroxide (per monomer)

Polymerization temperature: 60° C.
Polymerization time: 5 hrs.

5 g. of the thus obtained copolymer was dissolved in 210 ml. of a mixture of 55 parts of acetone, 35 parts of methanol and 15 parts of water, and then 5 g. of NaOH was added to the resulting solution to completely saponify the copolymer at 40° C. The resulting saponified copolymer was completely lactonized with 1 N hydrochloric acid at 95° C until the increase in lactone content of the copolymer was stopped.

TABLE 1

| No. | Copolymer used | Copolymer composition (molar ratio) | Amount of lactone formed (wt %) | Remarks |
| --- | --- | --- | --- | --- |
| 1 | AN:MA:VAc | 25.0:24.9:50.1 | 90.3 | Present process |
| 2 | AN:VAc | 57.6:42.4 | 73.8 | |
| 3 | MA:VAc | 41.4:58.6 | 67.1 | |
| 4 | MA:VAc | 49.5:50.5 | 46.9 | Radical polymerization |

As is clear from Table 1, the lactonized polymer obtained by the present process has a high content of lactone unit. On the other hand, the lactonization of a copolymer obtained by a conventional radical polymerization method results in the formation of a polymer having only about 47 percent of lactone unit. Further, when an alternating copolymer composed of acrylonitrile, methyl acrylate and vinyl acetate is lactonized, there is obtained a polymer having a lactone content of 90 percent or more, and this well agrees with the theoretical value, 91.6 percent, obtained when a completely alternating copolymer is lactonized according to the Flory theory.

20 Parts of a highly lactonized polymer obtained by lactonizing an alternating terpolymer composed of acrylonitrile, methyl acrylate and vinyl acetate was dissolved in 80 parts of dimethylformamide, and the resulting solution was spun through a spinneret having 50 holes having a diameter of 0.09 mm. into an ethylene glycol coagulation bath at 70° C to form filaments, which were then stretched to 10 times the original length in an ethylene glycol bath at 130° C to obtain tough filaments. On the other hand, non-lactonized alternating terpolymer could not be spun into filaments because of its too low softening point. Furthermore, the decomposition point of the alternating copolymer is about 300° C, while that of the lactonized polymer was about 400° C. This proves that the properties are greatly improved by lactonization.

EXAMPLE 7

Into a 300-ml. glass reactor with a stirrer maintained at −78° C under a nitrogen atmosphere were charged 0.20 mole of methyl methacrylate and a solution of 40 millimoles of ethylaluminum sesquichloride ($Et_3Al_2Cl_3$) in 30 ml. of toluene, and then, 0.35 mole of vinyl butyl ether was added with stirring to the reactor. The temperature of the resulting mixture was elevated to 0° C, at which the mixture was subjected to polymerization for 3 hrs. The polymerization was terminated by adding methanol acidified with hydrochloric acid, after which the reaction product was separated and purified to obtain 24.1 g. of a white solid copolymer. 2.5 g. of the copolymer was dissolved in 36 g. of acetonitrile, and to the resulting solution were added 10 g. of sulfuric acid and 4 g. of water. The resulting mixture was treated at 82° C for 3 hrs. to obtain a highly lactonized polymer having 84 percent of lactone unit. A film having a good stretchability was obtained by pressing the thus obtained highly lactonized polymer. The lactone content was determined in the same manner as in Example 6.

EXAMPLE 8

Into a 300-ml. glass reactor maintained at −20° C under a nitrogen atmosphere were charged 0.20 mole of acrylonitrile (Q = 0.60, e = 1.20) and 30 ml. of xylene containing 50 millimoles of each of triethyl-aluminum and aluminum tribromide, and to the resulting mixture were added with stirring at 150° C 0.15 mole of vinyl propionate (Q = 0.052, e = −0.07) and 0.15 mole of isobutyl vinyl ether (Q = 0.014, e = −1.64), and the resulting mixture was subjected to polymerization for 3 hrs. The polymerization was terminated by adding methanol acidified with hydrochloric acid, after which the product was separated and purified to obtain 19.7 g. of a copolymer. 2 g. of this copolymer was dissolved in 50 ml. of acetone and to the resulting solution were added 5 g. of NaOH and 15 ml. of water. The resulting mixture was boiled under reflux to effect saponification for 3 hrs. 1 Part of the thus obtained saponified copolymer was dissolved in 100 parts of water, and 50 parts of glacial acetic acid was added to the resulting solution, and the resulting mixture was boiled under reflux to effect lactonization for 3 hrs., thereby obtaining a highly lactonized polymer having a lactone content of 89 percent. The lactone content was determined in the same manner as in Example 6.

A film having good stretchability was obtained by pressing the thus obtained highly lactonized polymer. Further, in the same manner as in Example 6, the lactonized polymer was dissolved in dimethyl formamide and the resulting solution was wet-spun into an ethylene glycol coagulating bath to obtain tough filaments.

EXAMPLE 9

Into a 200-ml. glass reactor with a stirrer maintained at −20° C under a nitrogen atmosphere were charged 0.20 mole of α-chloroacrylonitrile and 30 ml. of o-dichlorobenzene containing 10 millimoles of ethyl-aluminum sesquichloride, and the temperature of the resulting mixture was elevated with well stirring to 20° C, at which 0.50 mole of allyl chloroacetate and 0.45 millimole vanadium oxytrichloride as a polymerization promoter were added, and the resulting mixture was subjected to polymerization for 5 hrs. The polymerization was terminated by adding methanol acidified with hydrochloric acid, after which the product was separated to obtain 15.3 g. of a copolymer. The resulting copolymer was pressed to form a film, which was yellowed at about 110° C.

Further, 10 g. of the resulting alternating copolymer was added to 100 ml. of a 20 percent aqueous nitric acid solution containing 1 g. of $Al(NO_3)_3$, and the resulting mixture was maintained in a heterogeneous system with stirring in the boiling state for 5 hrs., after which the mixture was subjected to filtration and washing to obtain a highly lactonized polymer having a lactone content of 76 percent. A film obtained by pressing this lactonized polymer was transparent and tough, and was stable even when heated at 200° C or more. The lactone content was determined in the same manner as in Example 6.

EXAMPLES 10 – 16

The procedure of Example 1 was repeated except that a combination of monomers shown in Table 2 was substituted for the combination of methyl methacrylate and vinyl butyl ether to obtain a copolymer, and the resulting copolymer was subjected to elementary analysis. The alternating copolymerizability of the copolymer was determined from the result of the elementary analysis and was as shown in Table 2.

TABLE 2

| Ex. No. | Group (A) monomer Name | Amt. (mole) | Group (B) monomer Name | Amt. (mole) | Alternating copolymerizability |
|---|---|---|---|---|---|
| 10 | Acrylonitrile | 0.20 | Allyl ethyl ether | 0.35 | Good |
| 11 | Acrylamide | 0.20 | Isopropenyl Methyl ether | 0.35 | Good |
| 12 | Acrylonitrile | 0.20 | β-Chlorovinyl butyl ether | 0.35 | Very good |
| 13 | Methyl methacrylate | 0.20 | Phenyl vinyl ether | 0.35 | Good |
| 14 | Methyl acrylate | 0.20 | α-Bromovinyl phenyl ether + 2-chlorophenyl vinyl ether | 0.17 +0.17 | Good |
| 15 | Acrylonitrile + N,N-dimethyl acrylamide | 0.10 +0.10 | 2-Chloroethyl allyl ether | 0.35 | Good |
| 16 | Acrylonitrile + methyl acrylate | 0.10 +0.10 | — | — | Not polymerized |

What we claim is:

1. An alternating copolymer consisting essentially of a structure wherein monomer units from group (A) alternate with monomer units from group (B), such that each monomer unit is linked only to monomer units from the other group and being composed of the group ($A_1$) monomer consisting of at least one unsaturated ether having the formula,

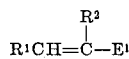

wherein $E^1$ is selected from $-OR^3$ and $-CH_2-O-R^3$, $R^1$ and $R^2$ each are hydrogen atoms, halogen atoms or nonpolymerizable hydrocarbons or halohydrocarbon radicals having one to 20 carbon atoms (provided at least one of $R^1$ and $R^2$ is a hydrogen atom), and $R^3$ is a nonpolymerizable hydrocarbon or halohydrocarbon radical having one to 20 carbon atoms or a combination of at least one unsaturated ether and at least one unsaturated ester of carboxylic acid, the group ($A_2$) monomer, having the formula,

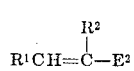

wherein $E^2$ is selected from

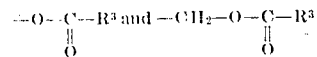

$R^1$, $R^2$ and $R^3$ are the same as defined above, and the group (B) monomer consisting of at least one conjugated vinyl compound having the formula,

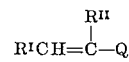

wherein $R^I$ and $R^{II}$ each are nonpolymerizable hydrocarbon or halohydrocarbon radicals having one to 20 carbon atoms, halogen atoms, or hydrogen atoms (provided at least one of $R^I$ and $R^{II}$ is a hydrogen atom), and Q is a nitrile group or a

group in which Y is $OR^{III}$, OMe, $NR^{IV}R^V$, or a halogen atom, where $R^{III}$, $R^{IV}$ and $R^V$ each are hydrogen atoms or hydrocarbon or halohydrocarbon radicals having one to 20 carbon atoms (including the case wherein $R^{IV}$ and $R^V$ are bonded to each other through an atom other than the nitrogen atom); and Me is an ammonium radical or an element of Groups I to III of Mendeleev's Periodic Table.

2. An alternating copolymer according to claim 1, wherein the unsaturated ether is a vinyl hydrocarbyl ether, vinyl halohydrocarbyl ether, allyl hydrocarbyl ether or allyl halohydrocarbyl ether.

3. An alternating copolymer according to claim 1, wherein the unsaturated ether is a vinyl alkyl ether or vinyl haloalkyl ether.

4. An alternating copolymer according to claim 1, wherein the unsaturated ether is a vinyl haloalkyl ether.

5. An alternating copolymer according to claim 1, wherein the unsaturated ether is vinyl methyl ether, vinyl isobutyl ether, vinyl 2-chloroethyl ether or vinyl 3-chloropropyl ether.

6. An alternating copolymer according to claim 1 wherein the conjugated vinyl compound is acrylonitrile, acrylic acid, an acrylic ester, an acrylamide (including an N-substituted or N,N-disubstituted acrylamide), an acryloyl halide, an acrylic salt, or a hydrocarbon, halohydrocarbon or halogen α- or β-substituted compound thereof.

7. An alternating copolymer according to claim 1, wherein the conjugated vinyl compound is acrylonitrile, an alkyl acrylate, acrylic acid, an acrylamide or an alkyl methacrylate.

8. An alternating copolymer according to claim 1, wherein the conjugated vinyl compound is acrylonitrile, methyl acrylate or methyl methacrylate.

9. An alternating copolymer according to claim 1, wherein the unsaturated ester of carboxylic acid is a vinyl carboxylate or an allyl carboxylate.

10. An alternating copolymer according to claim 1, wherein the unsaturated ester of carboxylic acid is a vinyl ester of a fatty acid.

11. An alternating copolymer according to claim 1, wherein the unsaturated ester of carboxylic acid is vinyl formate, vinyl acetate, vinyl propionate, vinyl butyrate, vinyl caproate, vinyl stearate, vinyl chloroacetate, vinyl benzoate, vinyl cyclohexanecarboxylate vinyl norbornane-2-carboxylate, allyl acetate, allyl propionate, allyl benzoate, allyl chloroacetate, 2-chloroallyl acetate, isopropenyl acetate, β-methallyl acetate.

12. An alternating copolymer according to claim 1, wherein the unsaturated ester of carboxylic acid is vinyl acetate or vinyl propionate.

13. An alternating copolymer consisting essentially of a structure wherein monomer units from group (A) alternate with monomer units from group (B), such that each monomer unit is linked only to monomer units from the other group and being composed of the group (A) monomer consisting of at least one unsaturated ether having the formula,

wherein $E^1$ is selected from $-OR^3$ and $-CH_2-O-R^3$, $R^1$ and $R^2$ each are hydrogen atoms, halogen atoms or nonpolymerizable hydrocarbon or halohydrocarbon radicals having one to 20 carbon atoms (provided at least one of $R^1$ and $R^2$ is a hydrogen atom), and $R^3$ is a nonpolymerizable hydrocarbon or halohydrocarbon radical having one to 20 carbon atoms and the group (B) monomer consisting of at least one conjugated vinyl compound having the formula,

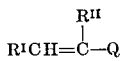

wherein $R^I$ and $R^{II}$ each are nonpolymerizable hydrocarbon or halohydrocarbon radicals having one to 20 carbon atoms, halogen atoms, or hydrogen atoms (provided at least one of $R^I$ and $R^{II}$ is a hydrogen atom), and Q is a nitrile group or a $$-\underset{\underset{O}{\|}}{C}-Y$$

group in which Y is $OR^{III}$, OME, $NR^{IV}R^V$, or a halogen atom, where $R^{III}$, $R^{IV}$ and $R^V$ each are hydrogen atoms or hydrocarbon or halohydrocarbon radicals having one to 20 carbon atoms (including the case where $R^{IV}$ and $R^V$ are bonded to each other through at atom other than the nitrogen atom); and Me is an ammonium radical or an element of Groups I to III of Mendeleev's Periodic Table.

* * * * *